United States Patent
Iturralde et al.

(10) Patent No.: US 7,490,869 B2
(45) Date of Patent: Feb. 17, 2009

(54) COUPLING FOR AN OUTLET CONDUIT OF A WASHING TANK OF A WASHING MACHINE

(75) Inventors: Amaia Iturralde, Azkoitia (ES); Susana Lete, Eskoriatza (ES); Roman Balanzategui, Mondragon (ES)

(73) Assignee: Coprecitec, S.L., Aretxabaleta (ES)

( * ) Notice: Subject to any disclaimer, the term of this patent is extended or adjusted under 35 U.S.C. 154(b) by 247 days.

(21) Appl. No.: 11/489,333

(22) Filed: Jul. 19, 2006

(65) Prior Publication Data

US 2007/0018453 A1     Jan. 25, 2007

(51) Int. Cl.
*F16L 19/00*     (2006.01)
(52) U.S. Cl. .................. 285/374; 285/345; 68/208
(58) Field of Classification Search .......... 285/374, 285/344, 345, 347; 68/208
See application file for complete search history.

(56) References Cited

U.S. PATENT DOCUMENTS

| | | | | |
|---|---|---|---|---|
| 795,976 A | * | 8/1905 | Herrick | 285/339 |
| 990,646 A | * | 4/1911 | Fisher | 285/56 |
| 2,506,687 A | * | 5/1950 | Scherrer | 313/237 |
| 2,965,396 A | * | 12/1960 | Reynolds et al. | 285/320 |
| 3,807,744 A | * | 4/1974 | Gibling | 277/607 |
| 4,161,043 A | * | 7/1979 | Flores | 52/302.1 |
| 4,993,756 A | * | 2/1991 | Bechu | 285/319 |
| 5,232,252 A | * | 8/1993 | Bartholomew | 285/108 |
| 5,362,112 A | * | 11/1994 | Hamilton et al. | 285/110 |
| 5,709,411 A | * | 1/1998 | Bank et al. | 285/110 |
| 5,730,474 A | * | 3/1998 | Bank | 285/110 |
| 6,113,158 A | * | 9/2000 | Bocchicchio et al. | 285/331 |

\* cited by examiner

*Primary Examiner*—David E Bochna
(74) *Attorney, Agent, or Firm*—Peter B. Scull; Berenbaum Weinshienk & Eason; Tim L. Kitchen

(57) ABSTRACT

"Coupling for an outlet conduit (2) of a washing tank (1) of a washing machine, the coupling comprising a connection conduit (3) coupled to said outlet conduit (2), and a sealing gasket (4) between said outlet conduit (2) and said connection conduit (3). Said sealing gasket (4) comprises a base (5) and two lateral walls (6,7) that delimit a first housing (8) in which the end of the outlet conduit (2) is housed, and the connection conduit (3) comprises a substantially transversal surface (9) and two lateral surfaces (10,11) that delimit a second housing (12) in which the sealing gasket (4) is housed."

6 Claims, 7 Drawing Sheets

COUPLING FOR AN OUTLET CONDUIT OF A WASHING TANK OF A WASHING MACHINE

TECHNICAL FIELD

The present invention relates to couplings for an outlet conduit of a washing tank of a domestic washing machine.

PRIOR ART

Domestic washing machines of current design comprise a removing system for extracting wash water from the washing tank by means of a draining pump. ES 2142714 A1 discloses a water removing system that comprises a connection conduit connected to the outlet conduit, with said connection conduit connected in turn to a hydraulic body that houses a draining pump, and with said hydraulic body connected to the outer draining outlet by a draining pipe.

It is important to ensure watertightness between the outlet conduit of the washing tank and the connection conduit connected to it. To achieve this, ring-shaped sealing gaskets are known to be used and are disposed between the exterior surface of one of the conduits and the interior surface of the other conduit, with said exterior and interior surfaces exerting pressure radially on said sealing gasket. EP 1443254 A1 shows an example of use of this type of ring-shaped sealing gasket for connecting two conduits.

Due to the size and the material of the washing tank, it is difficult to obtain dimensional precision in the outlet conduit of said washing tank. This may mean that, as the cross sections of said outlet conduit and the connection conduit are not completely circular, sufficient watertightness all the way around the perimeter of the conduits cannot be obtained using a ring-shaped sealing gasket.

DISCLOSURE OF THE INVENTION

It is an object of the invention to provide a coupling for an outlet conduit of a washing tank of a washing machine in which sufficient watertightness all the way around the perimeter of said outlet conduit can be obtained.

The coupling of the invention comprises a connection conduit coupled to said outlet conduit, and a sealing gasket between said outlet conduit and said connection conduit. Said sealing gasket comprises a base and two lateral walls that delimit a first housing in which the end of the outlet conduit is housed, and the connection conduit comprises a substantially transversal surface and two lateral surfaces that delimit a second housing in which the sealing gasket is housed. Thus, the two lateral surfaces of the connection conduit exert pressure radially on the lateral walls of said sealing gasket.

In the coupling of the invention, given that the connection coupling presses the sealing gasket laterally against the outlet conduit of the washing tank both from the exterior and from the interior of said outlet conduit, watertightness all the way around the perimeter of the outlet conduit is obtained even if the cross sections of the outlet conduit and the connection conduit are not completely circular. In this way, although an increase or decrease in the diameter of the connection conduit causes the compression of the sealing gasket to vary, a smaller compression of one of the lateral walls of said sealing gasket is compensated by the greater compression of the other lateral wall, thereby ensuring watertightness.

This improvement in the watertightness is obtained without having to increase the number of parts used or make the fitting process more difficult.

Furthermore, the coupling of the invention can be used without having to make any change to the design of the washing tanks and specifically to the outlet conduit.

These and other advantages and characteristics of the invention will be made evident in the light of the drawings and the detailed description thereof.

DETAILED DISCLOSURE OF THE INVENTION

Figure 1:
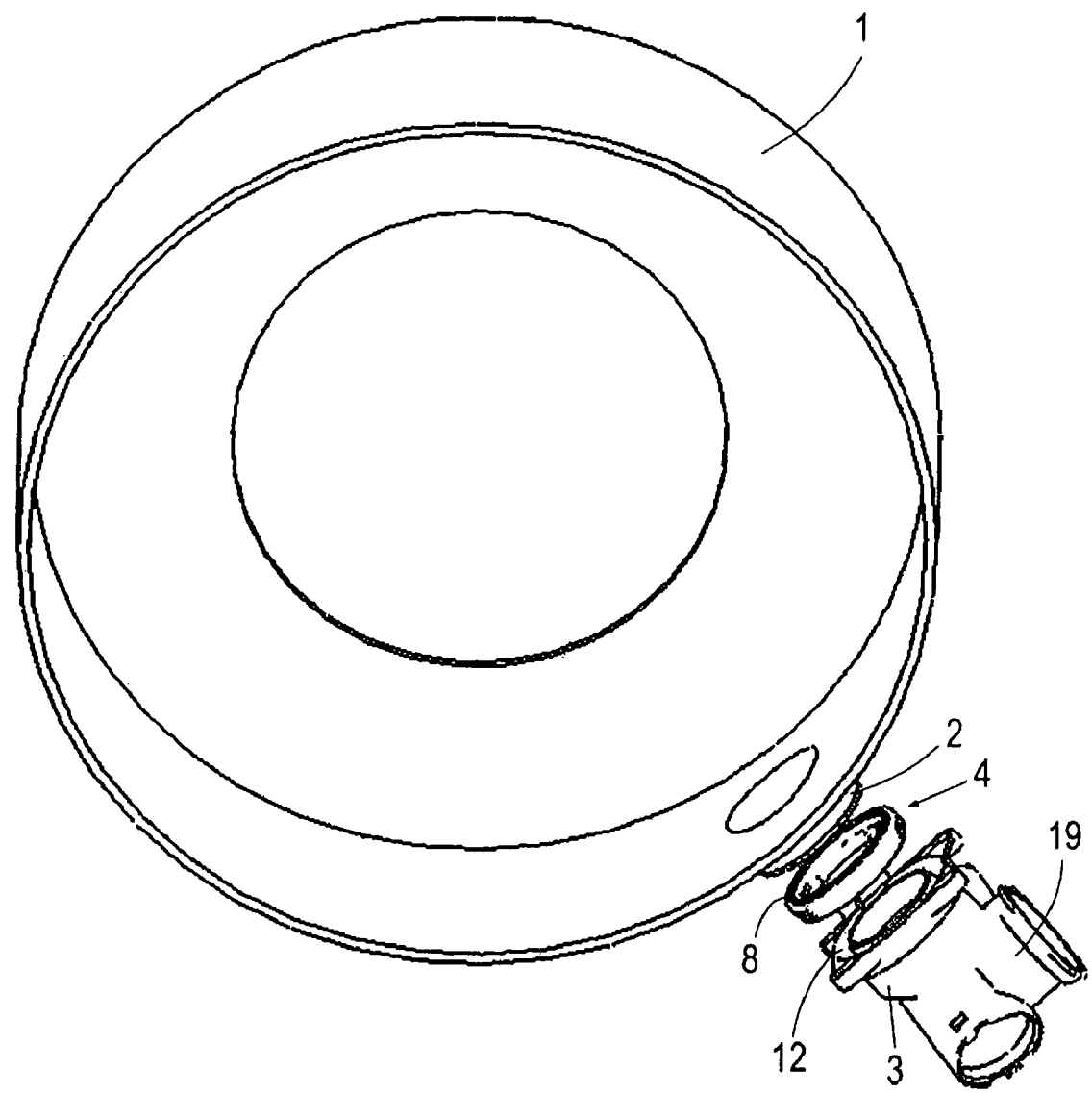
FIG. 1 is an exploded view of a washing tank and a coupling according to an embodiment of the invention.
Figure 2:
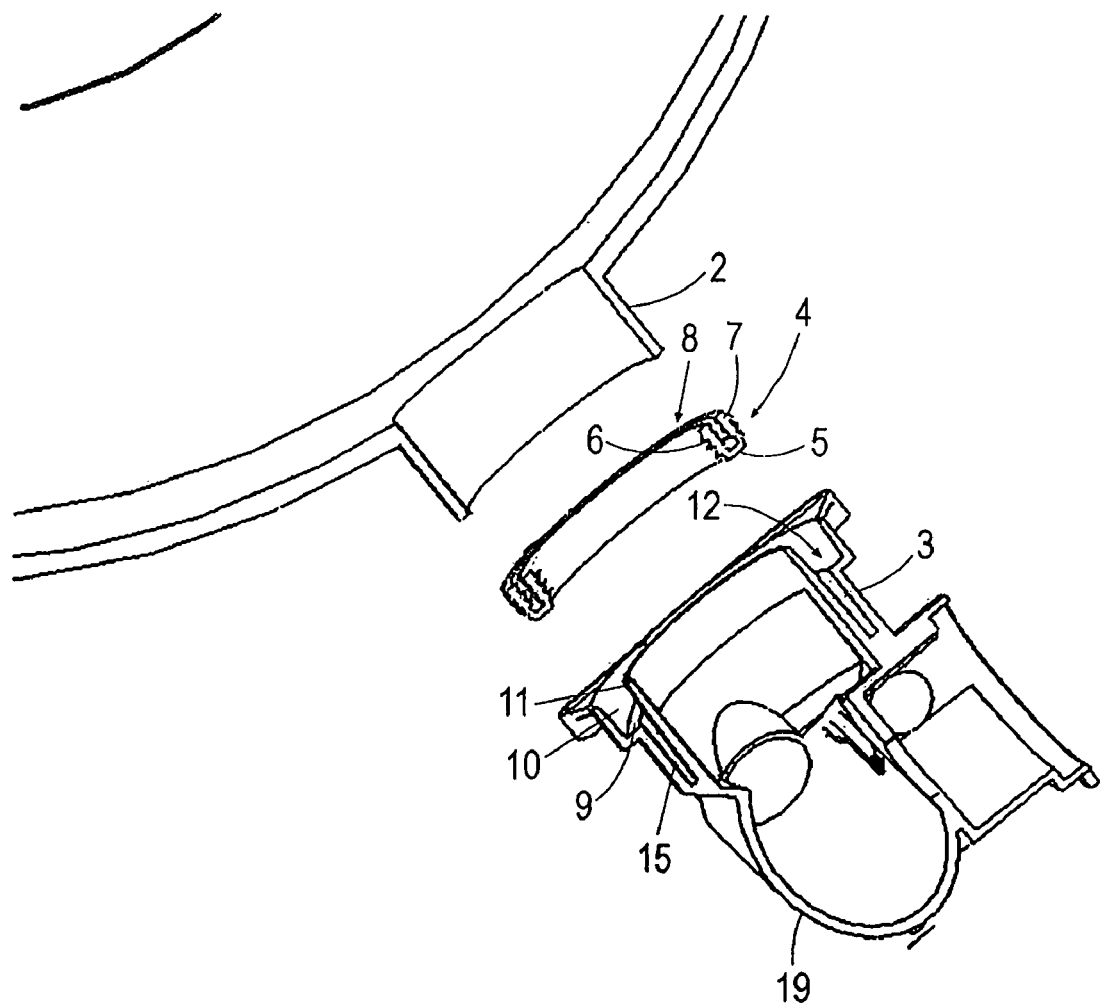
FIG. 2 is an exploded view in section of the coupling in FIG. 1.
Figure 3:
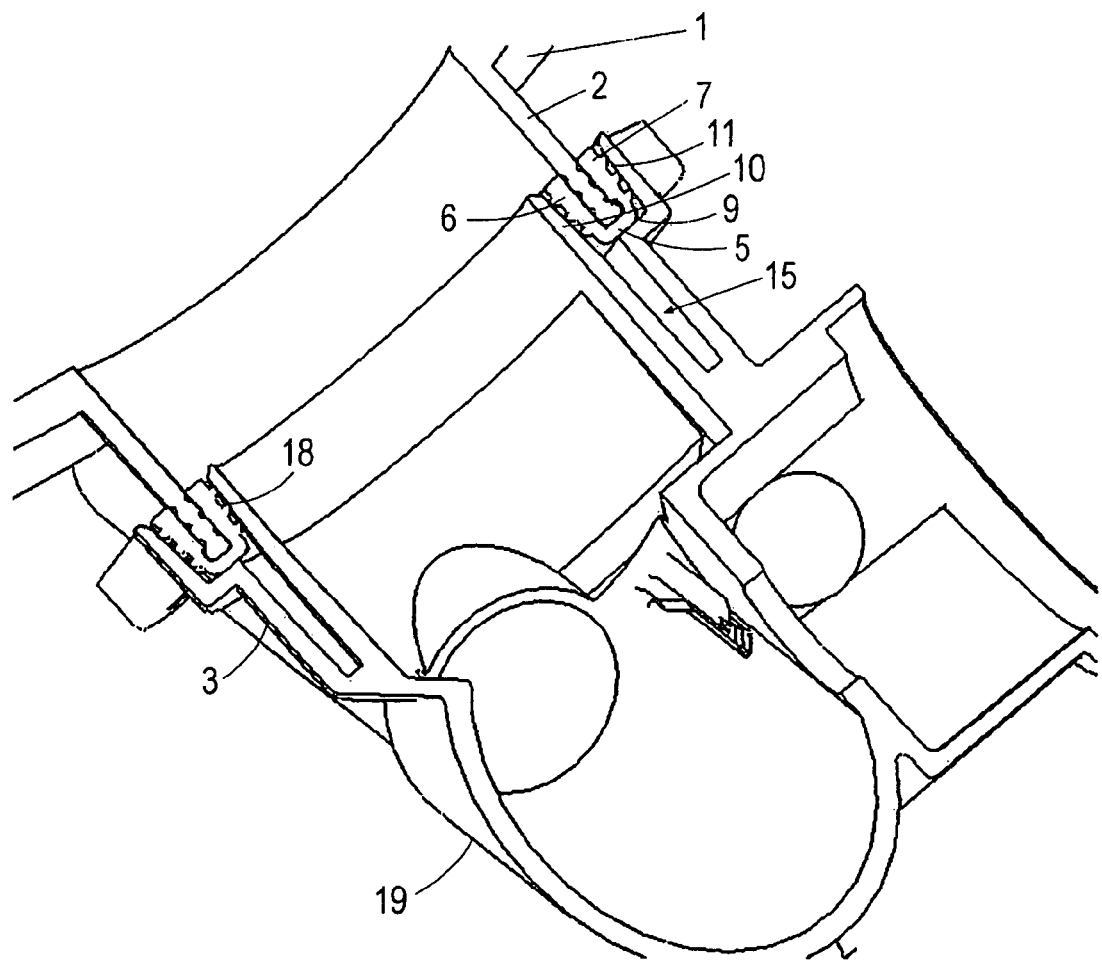
FIG. 3 is a first view in section of the coupling in FIG. 1.
Figure 4:
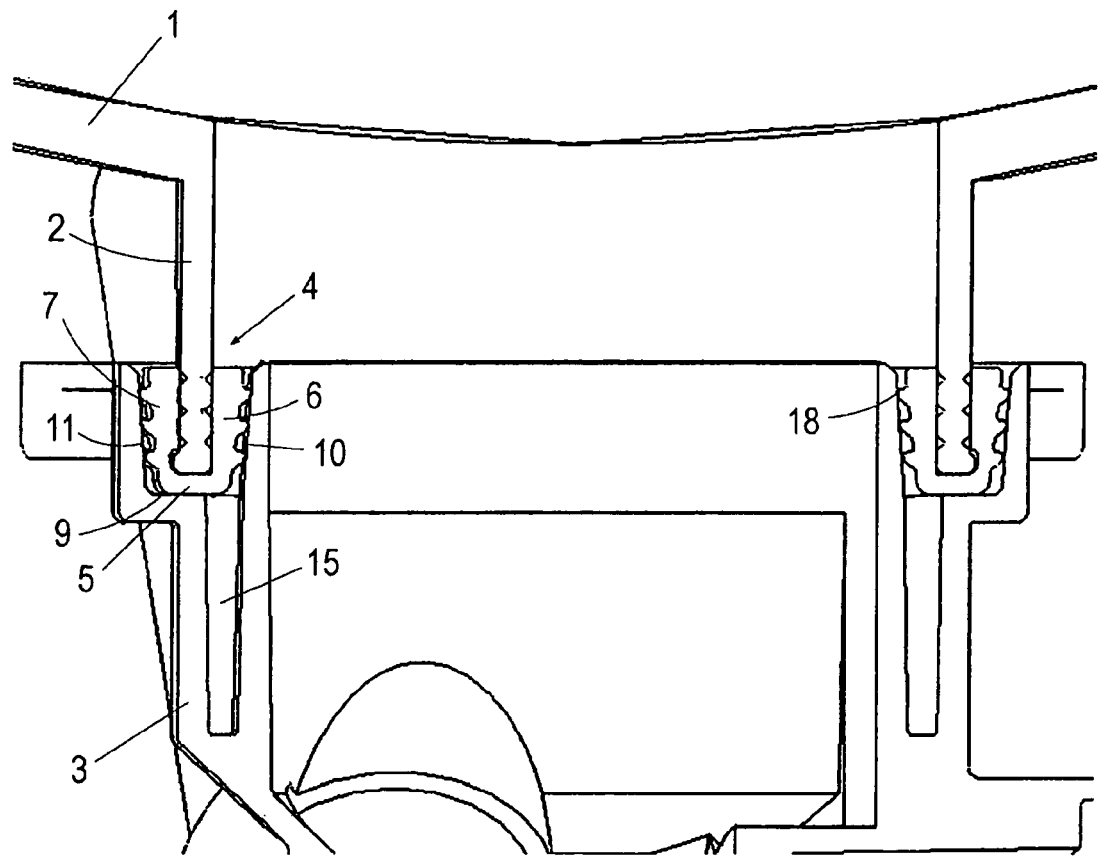
FIG. 4 is a second view in section of the coupling in FIG. 1.

The coupling of the invention is applied in particular to a washing tank 1 of a washing machine that comprises, as shown in FIG. 1, an outlet conduit 2. Said washing tank 1 is usually manufactured in plastic material and the outlet conduit 2 usually has a substantially circular cross section. The coupling of the invention comprises a connection conduit 3 coupled to said outlet conduit 2, and a sealing gasket 4 between said outlet conduit 2 and said connection conduit 3.

Figure 5:
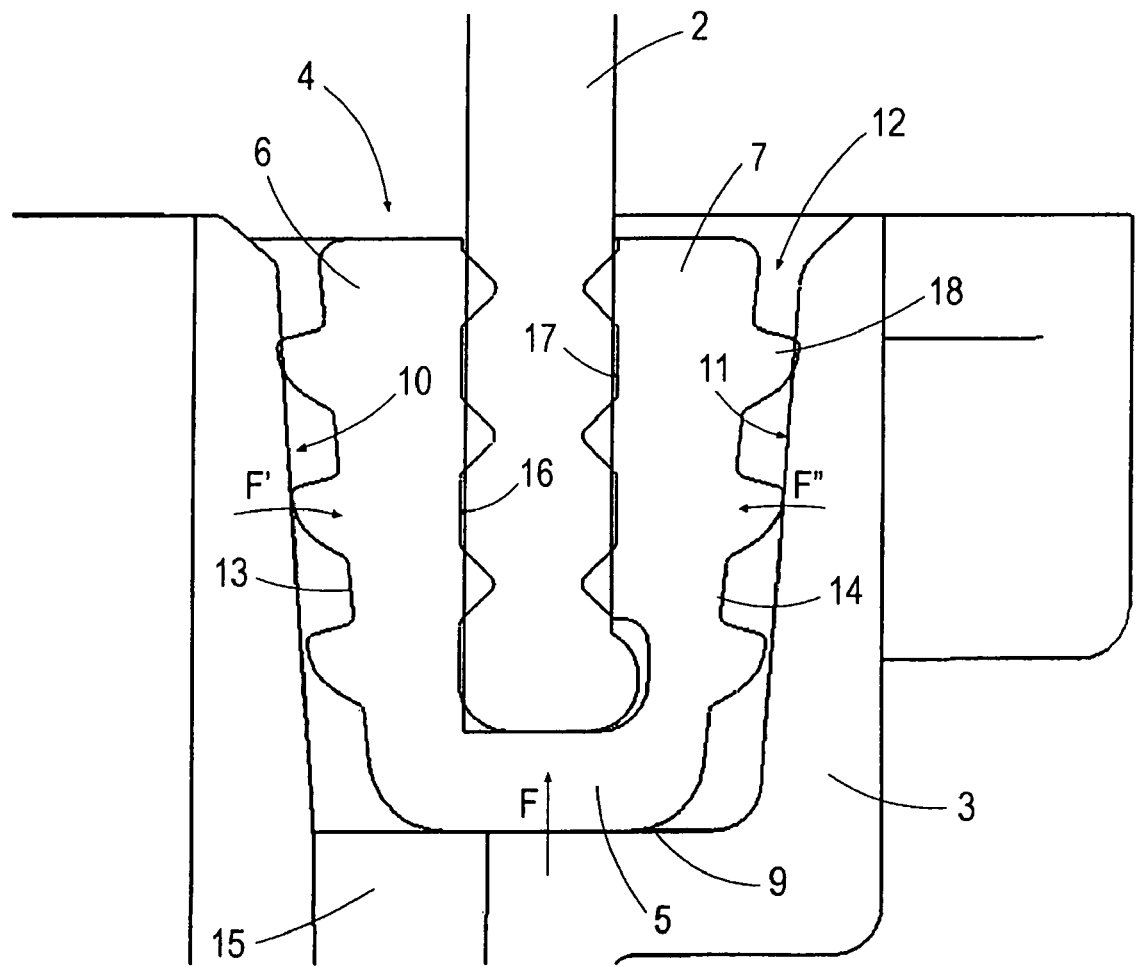
FIG. 5 is a schematic view in section of a detail of the coupling in FIG. 1.
Figure 6:
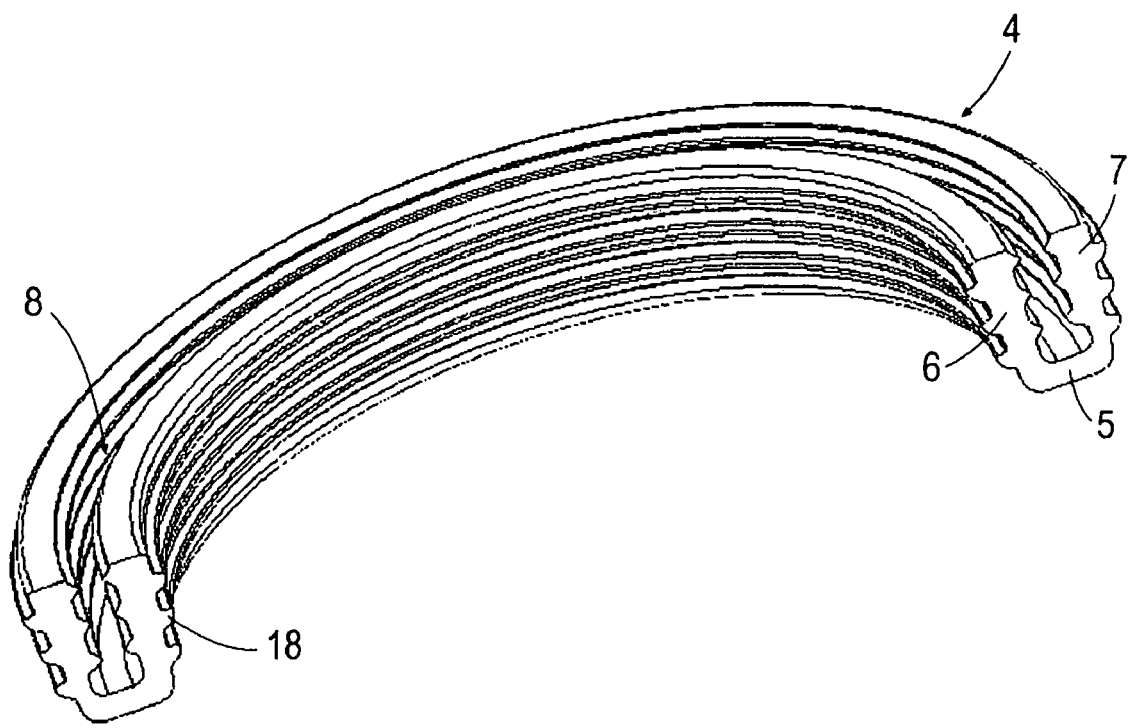
FIG. 6 is a view in perspective and in section of the sealing gasket of the embodiment in FIG. 1.

The sealing gasket 4, shown in FIG. 6, comprises a base 5 and two lateral walls 6 and 7 that delimit a housing 8. As shown in the figures, the sealing gasket 4 is connected to said outlet conduit 2 in such a way that the end of said outlet conduit 2 is housed in said housing 8. The connection conduit 3 comprises in turn a transversal surface 9 and two lateral surfaces 10 and 11 that delimit a housing 12 in which the sealing gasket is housed 4. In this way, as indicated in FIG. 5, the two lateral surfaces 10 and 11 of the connection conduit 3 exert forces F' and F''' radially on the lateral walls 6 and 7 of said sealing gasket 4.

In addition, the transversal surface 9 of the connection conduit 3 exerts an axial force F on the base 5 of the sealing gasket 4, with the coupling of the invention thus combining the lateral pressure on the sealing gasket 4 with the axial pressure. Thus, what is obtained is not a pure radial closure nor a pure axial closure, but a combination of both closures.

As can be seen in FIG. 5, the exterior surfaces 13 and 14 of the lateral walls 6 and 7 respectively of the sealing gasket 4 are inclined towards the exterior from the base 5, and the lateral surfaces 10 and 11 of the connection conduit 3 are also inclined towards the exterior from the transversal surface 9 of said conduit 3. The inclination of the exterior surfaces 13 and 14 of the lateral walls 6 and 7 of the sealing gasket 4 is greater than the inclination of the lateral surfaces 10 and 11 of the connection conduit 3. This configuration with inclined planes makes the coupling easier to fit.

The connection conduit 3 comprises, in addition to the housing 12, a chamber 15 connecting with said housing 12. In this way, during the fitting of the coupling, the air remaining between the connection conduit 3 and the sealing gasket 4 may be compressed in the chamber 5 without offering resistance.

Furthermore, the lateral walls 6 and 7 of the sealing gasket 4 comprise, both on their exterior surfaces 13 and 14 and on their interior surfaces 16 and 17, some ring-shaped projections 18. The projections 18 of the exterior surfaces 13 and 14 are compressed respectively on the lateral surfaces 10 and 11 of the connection conduit 3, and the projections 18 of the interior surfaces 16 and 17 are compressed respectively on the exterior surface and the interior surface of the outlet conduit 2, thereby contributing to improved watertightness.

Figure 7:
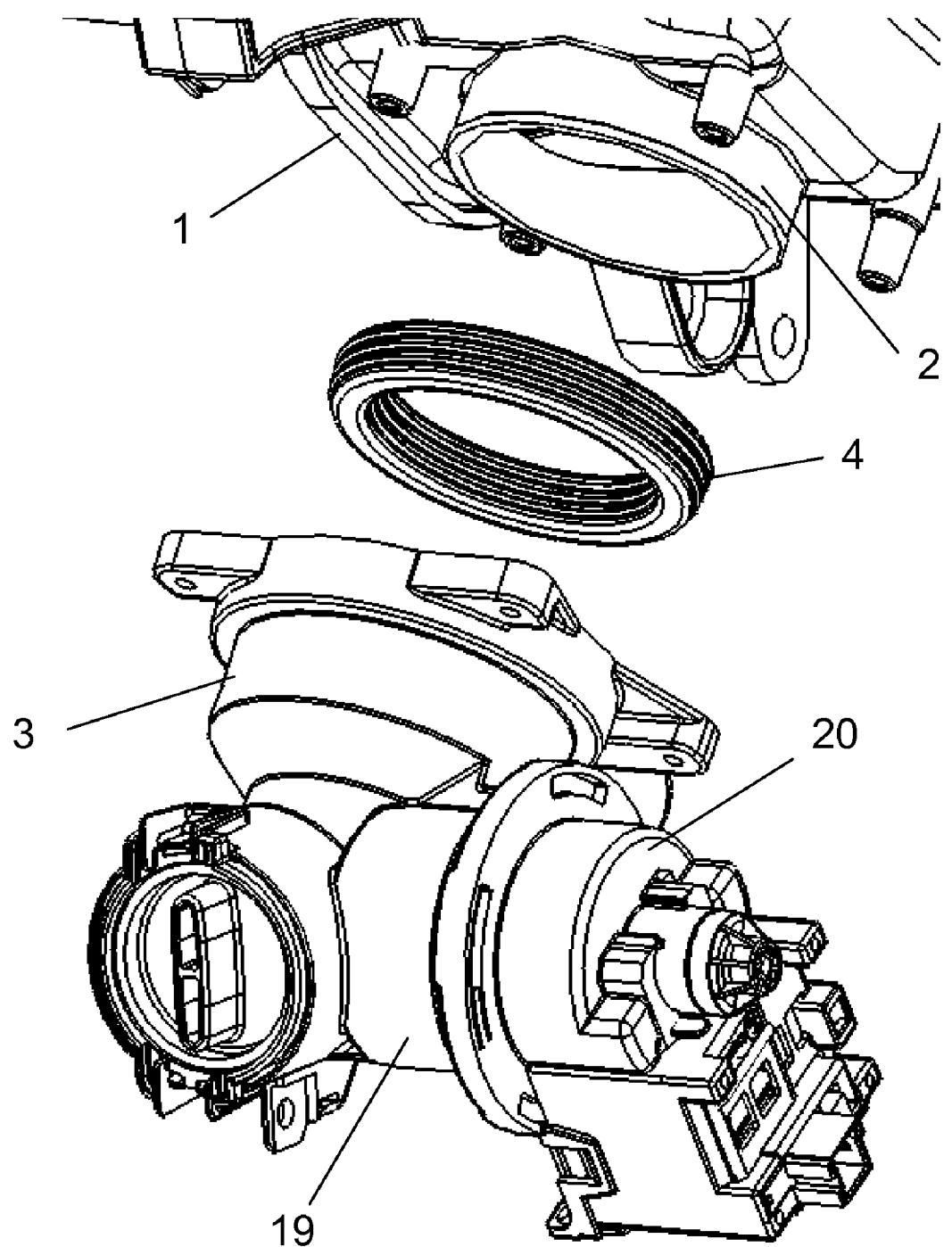
FIG. 7 is a view in perspective of an assembly according to an embodiment where the connection conduit forms part of a draining pump.

In the embodiment shown in the figures, the connection conduit 3 forms part of a hydraulic body 19 of a draining pump 20 as shown in FIG. 7, as a result of which said draining pump 20 is connected directly to the outlet conduit 2, thereby avoiding the use of intermediate elements between said outlet conduit 2 and the draining pump.

What is claimed is:

1. A coupling of an outlet conduit of a washing tank of a washing machine, the coupling comprising a connection conduit coupled to said outlet conduit that carries water away from the washing tank, and a sealing gasket between said outlet conduit and said connection conduit, said sealing gasket comprising a base and two lateral walls each having an interior surface and an exterior surface, said two lateral walls delimit a first housing in which the end of the outlet conduit is housed, and the connection conduit comprising a base surface and two lateral surfaces that delimit a second housing in which the sealing gasket is housed, the two lateral surfaces of the connection conduit exerting pressure radially on the lateral walls of said sealing gasket.

2. The coupling according to claim 1, wherein the base surface of the connection conduit exerts pressure axially on the base of the sealing gasket.

3. The coupling according to claim 1, wherein the exterior surfaces of the lateral walls of the sealing gasket are inclined towards the exterior from the base, and the lateral surfaces of the connection conduit are also inclined towards the exterior from the base surface of said conduit, with the inclination of the exterior surfaces of the lateral walls of the sealing gasket being greater than the inclination of the lateral surfaces of the connection conduit.

4. The coupling according to claim 1, wherein the connection conduit comprises an opening in the base surface that connects the second housing to a chamber in the connection conduit that is capable of receiving air expelled from the housing when the sealing gasket is positioned within the second housing.

5. The coupling according to claim 1, wherein the lateral walls of the sealing gasket comprise, both on their exterior surfaces and on their interior surfaces, ring-shaped projections.

6. The coupling according to claim 1, wherein the connection conduit forms part of a draining pump.

* * * * *